April 12, 1927.
W. R. MALM
1,624,493
LUGGAGE CARRIER
Filed March 11, 1926　　2 Sheets-Sheet 1
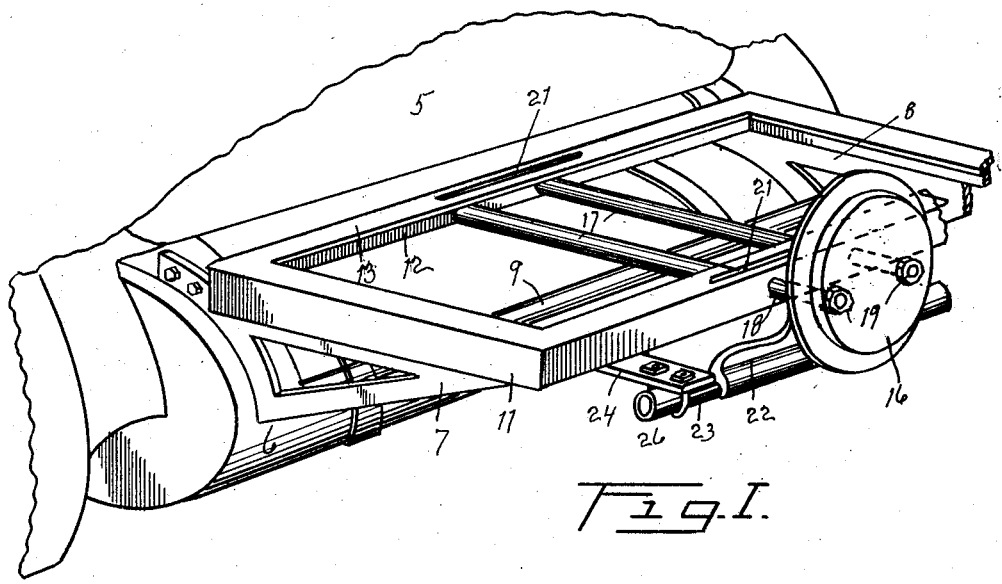
Fig. I.
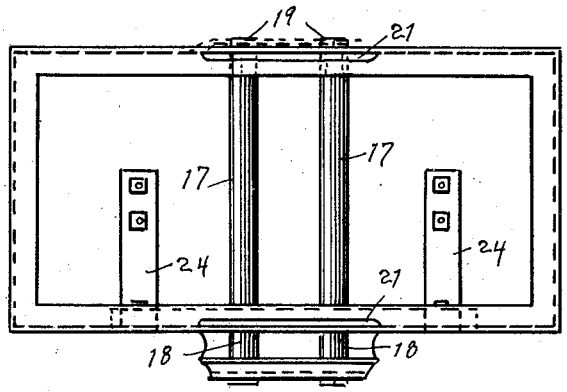
Fig. II.
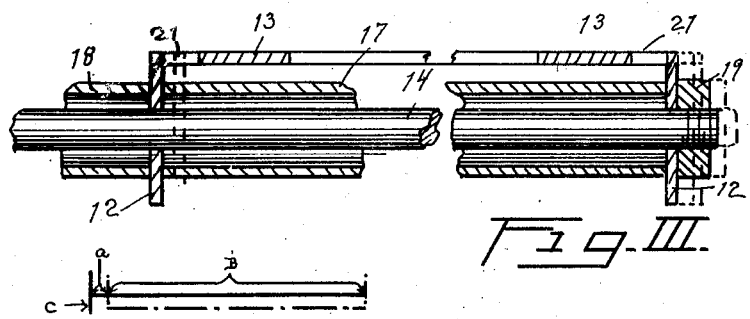
Fig. III.
Fig. IV.
INVENTOR.
W. R. MALM
BY
ATTORNEY April 12, 1927. 1,624,493
W. R. MALM
LUGGAGE CARRIER
Filed March 11, 1926 2 Sheets-Sheet 2
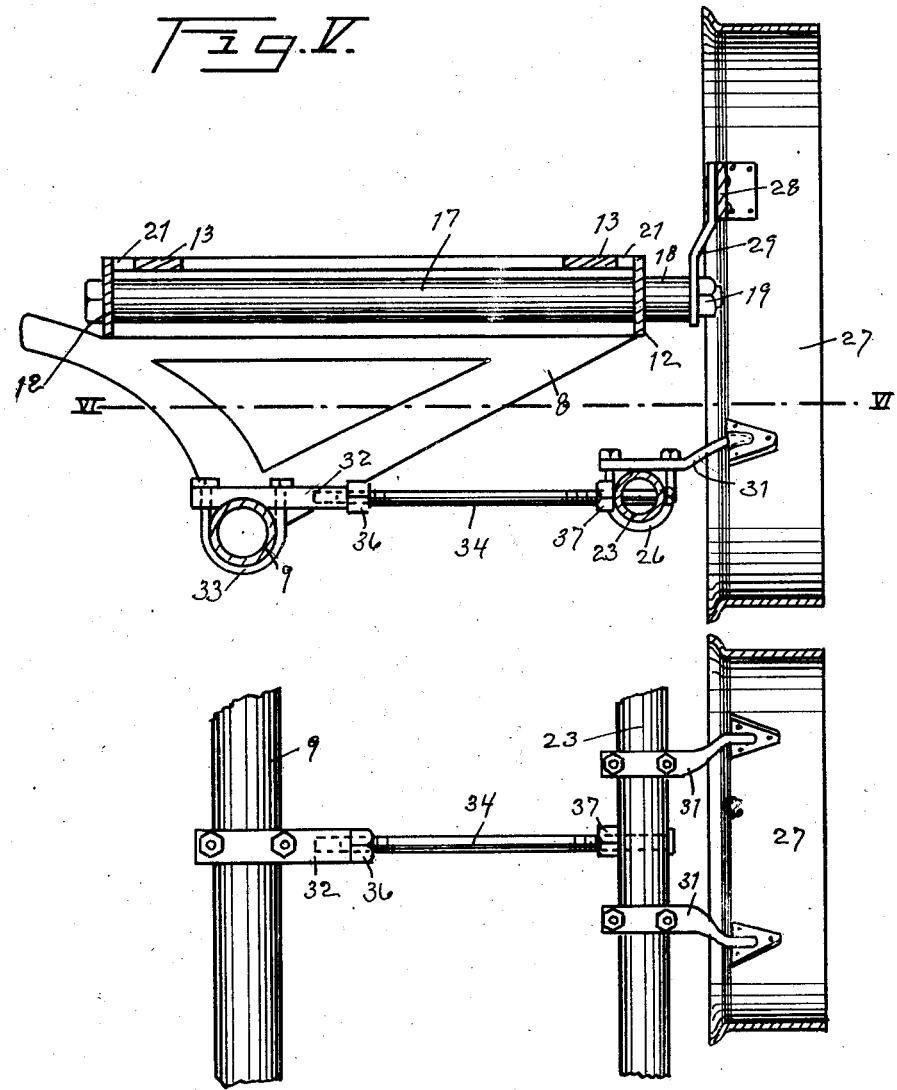
INVENTOR.
W. R. MALM
BY
ATTORNEY.

Patented Apr. 12, 1927.

1,624,493

UNITED STATES PATENT OFFICE.

WALTER R. MALM, OF SAN FRANCISCO, CALIFORNIA.

LUGGAGE CARRIER.

Application filed March 11, 1926. Serial No. 93,964.

This invention relates to improvements in luggage carriers and has particular reference to a luggage carrier or supporting rack to be attached to the rear of an automobile.

The principal object of this invention is to produce a rack which will be strong in construction, and one which will receive any blow struck thereagainst and dissipate the blow throughout the rack and to the frame of the machine to which the rack is attached.

Another object is to produce a rack of this character which is cheap to manufacture and, therefore, well within the purchase price of the average user.

An additional object is to produce a rack which may be readily attached to any standard form of automobile without materially altering the construction of the same.

A still further object is to produce a rack which will be neat in appearance and one which will not detract from the pleasing lines of a vehicle.

Another object is to produce a rack upon which either a disc wheel may be supported or an ordinary rim having a tire thereon and to further provide means for rigidly supporting the wheels or rim against undue vibration.

Other objects and advantages will be apparent during the course of the following description.

In the accompanying drawings forming a part of this specification, and in which like numerals are employed to designate like parts throughout the same, Figure I is a perspective view of my improved rack attached to the rear of an automobile, Figure II is a top plan view of my rack, Figure III is an enlarged detail cross section showing one of my re-enforcing elements, Figure IV is a diagrammatic view showing the leverage secured by my re-enforcing element, Figure V is a vertical cross section of my improved rack showing a rim holder secured thereto, and Figure VI is a horizontal cross section taken on the line 6—6 of Figure V.

In the placing of a rack upon the rear of a vehicle, the overall length of the vehicle is materially increased, the result being that it is difficult to place an adequate rear bumper upon the vehicle without having the same spaced an excessive distance from the rear of the vehicle. Therefore, it is customary to only employ tip bumpers which merely guard the wheel fenders, the result being that a collision between a vehicle approaching from the rear results in the crushing of the spare tire, its support and often the damaging of the rack beyond repair and the trunk which may be mounted thereon.

This has become such a common occurrence that I have devised a means for re-enforcing the rack and wheel support in such a manner that any blow struck thereagainst will be dissipated throughout the entire rack and, in turn, transmitted to the frame of the vehicle.

In the accompanying drawings wherein for the purpose of illustration is shown a preferred embodiment of my invention, the numeral 5 designates a vehicle as a whole having a tank 6 secured thereto. Supported above the tank and attached to the chassis in any suitable manner are supporting brackets 7 and 8. These supporting brackets may rest upon the customary cross bar 9, if one is provided upon the vehicle as is quite common in many standard makes of automobiles.

The brackets 7 and 8, in turn, support a rectangular frame 11 which is constructed of angle iron having a vertical web 12 and a horizontal web 13.

Referring now to Figure III, it will be noted that the numeral 14 designates a rod extending through the vertical webs 12 in the front and rear of the rack. This rod extends beyond one of the webs so as to extend through a wheel-supporting element 16.

A spacer 17 surrounds the rod 14 and extends between the vertical webs 12. A similar spacer 18 surrounds the rod 14 and extends between the vertical web 12 and the wheel-retaining element 16. A nut 19 is screwed upon each end of the rod so that the spacers 17 and 18 will be drawn tightly against their respective abutting parts.

By referring to Figures I, II, and III, it will be noted that the front and rear horizontal webs 13 are slit as shown at 21, the result being that when a blow is struck upon the ends of the re-enforcing elements, the vertical webs 12 will give with the first blow and bend to the position shown in dotted lines in Figures II and III. It will also be noted that there will be very little tendency for vibration, due to the rigid construction caused by the leverage as brought out in Figure IV, where the arrow "a" represents the distance between the tire carrier and the back edge of the luggage carrier. The arrow "b" represents the leverage between the two vertical webs of the luggage carrier and the arrow "c" represents a blow which will be struck upon the tire carrier. It is thus apparent that the tire carrier is mounted on a lever fulcrumed but a short distance from the rack and is further braced by a long lever which gives a very rigid construction.

It will, therefore, be seen that the blow upon the tire carrier will be restricted by the leverage "b" as against the leverage "a." Therefore, any blow which should tend to twist the tire carrier would be amply restricted.

It is common knowledge that disc wheels are hard to carry, due to their vibration which results in the cracking of the disc or the cracking of the luggage carrier, due to crystallization brought on by excessive vibration. By employing my re-enforcing means I have so overcome this vibration that the same is substantially absent and, consequently, I can carry disc wheels as easily as ordinary rims.

At 22 I have shown a downwardly extending brace having a tubular cross piece 23. To this tubular cross piece I attach cross braces 24 as by U-bolts 26. These cross braces are secured by similar U-bolts to the rod 9.

In Figure V, I have shown a modified form wherein a rim carrying element 27 is shown. This rim carrying element is provided with a cross brace 28 to which brackets 29 are attached. These brackets, in turn, are secured to the re-enforcing elements. In order to support the lower portion of the rim carrier, I have shown a bracket 31 which is attached by the U-bolts 26 to a cross bar 23. This cross bar, in turn, is secured to the bar 9 as by a clamp 32 having a U-bolt 33 secured thereto.

A spacer bar 34 has screw-threaded engagement with the bar 23 and with the clamp 32, while adjusting nuts 36 and 37 serve to permit the necessary adjustment in positioning the rim carrier.

It will thus be seen that by employing the two re-enforcing elements, I am enabled to support a wheel or rim carrier upon the rear of a luggage carrier rack in such a manner that the same will be free of vibration and if struck from the rear the blow will be transmitted to the vertical webs of the rack and from this point dissipated throughout the entire rack and to the chassis of the vehicle to which my device is attached. This distribution of the blow saves the damage which would, otherwise, result in the crushing of the rim carrier and rack.

It will thus be noted that my device will accomplish all of the objects above set forth.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a luggage carrier adapted to be attached to a vehicle, a substantially rectangular frame constructed of angle iron and having downwardly extending webs, a pair of spaced re-enforcing elements extending between said webs and to a point beyond the outer margin of one of said webs, said re-enforcing elements comprising bars and spacer tubes placed thereover and extending between said webs, a tubular spacer positioned on each of said bars with said bars extending beyond said webs, a tire-carrying element positioned on said bars, and means for drawing said tire-engaging elements against said tubular spacer, for the purpose specified.

2. In a luggage carrier adapted to be attached to an automobile, said carrier comprising a pair of spaced brackets, a substantially rectangular frame positioned on said brackets, said frame having downwardly extending vertical webs, said frame having inwardly extending horizontal webs, a pair of parallel spaced re-enforcing elements positioned between said vertical webs and extending to a point outside of said frame, said horizontal webs having slits formed therein at a point adjacent said re-enforcing elements, a tire supporting element positioned on the free ends of said re-enforcing elements, for the purpose specified.

In testimony whereof I affix my signature.

WALTER R. MALM.